United States Patent [19]

Hanson et al.

[11] 3,959,233

[45] May 25, 1976

[54] PROCESS FOR PREPARING POLYAMIDE-IMIDE FROM TRIMELLITIC ACID, DIAMINE AND DIISOCYANATE AND POLYAMIDE IMIDE SHAPED ARTICLES

[75] Inventors: Robert B. Hanson, Aurora; James R. Stephens, Naperville, both of Ill.

[73] Assignee: Standard Oil Company (Indiana), Chicago, Ill.

[22] Filed: Apr. 9, 1973

[21] Appl. No.: 348,869

[52] U.S. Cl. ............. 260/77.5 R; 260/47 CB; 260/47 CP; 260/49; 260/63 N; 260/65; 260/78 TF; 428/458; 428/474
[51] Int. Cl.² .................................. C08G 73/14
[58] Field of Search ....... 260/78 TF, 47 CB, 77.5 R, 260/47 CP, 49, 63 N, 65; 117/124 E, 126 GR, 128.4, 132 B, 232; 161/197, 205, 227

[56] References Cited
UNITED STATES PATENTS

| | | | |
|---|---|---|---|
| 3,260,691 | 7/1966 | Lavin et al. | 260/30.2 |
| 3,518,230 | 6/1970 | Sheffer et al. | 260/65 |
| 3,562,189 | 2/1971 | Farrissey, Jr. et al. | 260/2.5 |
| 3,716,519 | 2/1973 | Yoda et al. | 260/47 CB |

*Primary Examiner*—Lester L. Lee
*Attorney, Agent, or Firm*—Gunar J. Blumberg; Arthur G. Gilkes; William T. McClain

[57] ABSTRACT

Polyamide-imides are prepared by reacting trimellitic acid with an aromatic or an aliphatic diamine in the molar ratio of about 1:0.55 to 1:0.95 and then reacting this product with at least 0.45 to about 0.75 moles to about 0.05 to about 0.35 moles of an aromatic diisocyanate. The products are useful as wire enamels and coatings when they are formulated into wire enamels and coated on electrical conductors. They may also be used as molding resins.

12 Claims, No Drawings

PROCESS FOR PREPARING POLYAMIDE-IMIDE FROM TRIMELLITIC ACID, DIAMINE AND DIISOCYANATE AND POLYAMIDE IMIDE SHAPED ARTICLES

This invention relates to high molecular weight polymers derived from trimellitic acid, aromatic and aliphatic diamines and diisocyanates. The products are useful for wire enamel in the protection of electrically conductive metallic wire such as copper.

The new polymers are also useful for the formation of a variety of heat-resistant insulating films, coatings and molded articles.

It has been discovered that polyamide-imide polymers result from the reaction of trimellitic acid with diamines and diisocyanates which exhibit surprisingly good wire enamel properties.

The prepolymers of this invention may be described as low molecular weight species which by design are not formed in high molecular weight since they are produced by reaction imbalance leaving an excess of carboxylic acid groups which are produced advantageously by the reaction of an excess of trimellitic acid to the aromatic or aliphatic primary diamines and which upon further reaction with diisocyanates produce high molecular weight polyamide-imides Such polyamide-imide prepolymers are polymeric polymer acid compounds having in their molecules units of

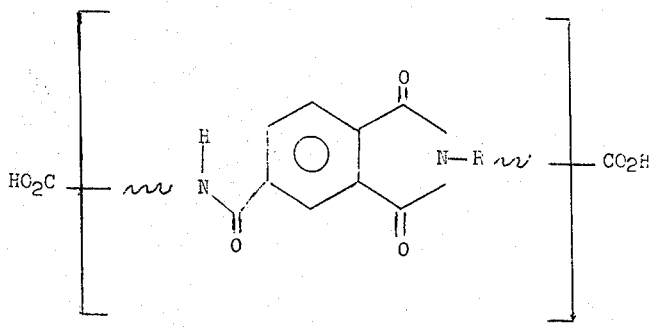

wherein R is a divalent aromatic or aliphatic organic radical. This organic radical consists of R' which is a divalent aromatic or aliphatic hydrocarbon radical or two R' divalent aromatic or aliphatic hydrocarbon radicals joined by stable linkages $-O-$, $-CH_2-$,

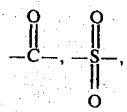

as are in the groups $-R'-O-R'$, $-R'-CH_2-R'$,

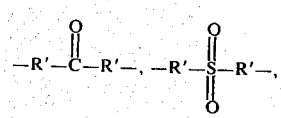

and $-R'-S-R'-$. These prepolymer products are reacted with diisocyanates to produce high molecular weight polyamide-imides having to a substantial extent recurring units of

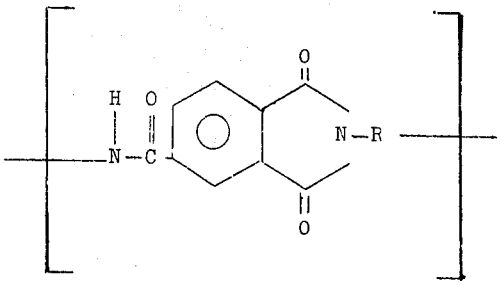

wherein R is a divalent aromatic or aliphatic organic radical in which in addition to hydrogen, nitrogen, sulfur and oxygen atoms can be attached to the carbon atoms. This organic radical consists of R', which is a divalent aromatic or aliphatic hydrocarbon or two R' divalent aromatic or aliphatic hydrocarbon radicals joined by stable linkages $-O-$, $-CH_2-$,

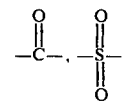

and $-S-$, as are in groups $-R'-O-R'$, $-R'-CH_2-R'-$,

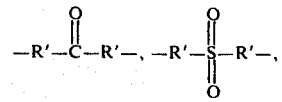

and $-R'-S-R'-$.

It has now been found that wire enamels and polymers can be obtained by reacting trimellitic acid with aromatic or aliphatic diamines in the molar ratio of 1 : 0.55 to about 1 : 0.95 and then reacting this product with about 0.45 to about 0.75 moles to about 0.05 to about 0.35 moles of an aromatic diisocyanate. Suitably, the molar ratio can be 1 mole trimellitic acid, about 0.7 to about 0.8 moles aromatic or aliphatic diamine and at least about 0.2 to about 0.3 moles of an aromatic or aliphatic diisocyanate.

In the above reaction, the trimellitic acid and the diamine react to form a polyamide-imide prepolymer. This low molecular weight species having carboxylic acid end groups is reacted with the diisocyanate. In the preferred embodiment 1 mole of trimetellitic acid is reacted with 0.8 mole of diamine. This polymer is then reacted with at least 0.2 moles of the diisocyanate.

The reaction between the trimellitic acid and the diamine is carried out at a temperature of about 210° to about 250°C, preferably at about 220°–230°C when atmospheric pressure is used. To this product is added the diisocyanate at a temperature ranging between room temperature and 125°C. Suitably, the reaction temperature may be 120°to 155°C and preferably this final reaction is initiated at room temperature and completed at about 135°C.

The polyamide-imide prepolymer forming reaction is normally carried out in the same solvent used to form the wire enamel. Nitrogen or sulfoxide containing organic polar solvents or substituted phenols are advantageously employed. Useful solvents include the following: N-methylpyrrolidone, cresylic acid, p-cresol, m-cresol, dimethyl sulfoxide, N-methyl caprolactum, dimethylsulfone, and phenol. The preferred solvent is N-methylpyrrolidone.

At the completion of the prepolymer forming step, diluents may be added. Representative diluents include N-methylpyrrolidone, dimethylacetamide (DMAC), dimethylformamide, or mixtures of the above with aromatic hydrocarbon streams (such as Solveso 100 and 150), xylenes and toluene.

The diamines useful for the reaction may be aromatic or aliphatic. These diamines have the formula $H_2N-R'-NH_2$, $H_2N-R'-O-R'-NH_2-$, $H_2N-R'-CH_2-R'-NH_2$,

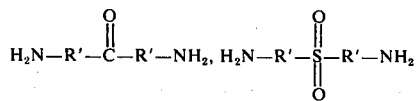

and $H_2N-R'-S-R'-NH_2$ wherein $R'$ is a divalent aromatic or aliphatic hydrocarbon radical, hereinbefore indicated. The aromatic diamines have from one to about four aromatic rings, advantageously from one to about two aromatic rings. The aromatic diamines having more than one aromatic ring may be further characterized as polycyclic aromatic compounds having two primary amino groups on an interconnected polycyclic aromatic nucleus. The aromatic rings may be interconnected by condensation, as in naphthalene or in phenanthrene-type structures, or may be bridged, either directly as in benzidine or indirectly as, for example, two $R'$ groups are joined with stable inert linkages such as oxy, alkenyl, carbonyl, sulfonyl and other relatively inactive groups such as sulfide groups as hereinbefore described. Suitable nuclei ($R'$ divalent aromatic hydrocarbon radical) include phenyl, naphthyl, anthryl, naphthacenyl and the like; diphenyl, terphenyl, phenylnaphthyl, quaterphenyl and the like; and aromatic rings separated by oxy, sulfonyl and thio groups, and aliphatic groups containing from 1–12 carbon atoms. The aliphatic diamines, including alkylene diamines such as hexamethylene diamine, ethylene diamine, pentamethylene diamine and dodecamethylene diamine, are useful.

Useful aromatic diamines include methylene bis(aniline), (4,4'-diaminodiphenylmethane), oxy bis(aniline), (4,4'-diaminodiphenylether), benzidine, m-phenylenediamine, p-phenylenediamine, 2,4- and 2,6-toluenediamine (and mixtures of such), 3,3'-diaminodiphenyl, 1,4-diaminonaphthalene, 4,4'-diaminodiphenyl ketone, 4,4'-diaminodiphenyl sulfone, bis(4-aminophenyl)-1,1-ethylene.

Useful aromatic diisocyanates include methylene bis(4-phenylisocyanate), oxy bis(4-phenylisocyanate), 1,5-naphthalene diisocyanate, m-phenylene diisocyanate, mesitylene diisocyanate, durylene diisocyanate, toluene diisocyanate, 4,4'-bi-o-tolylene diisocyanate, 4,4'-methylene-di-o-tolyldiisocyanate, 4-methoxy-1,3-phenylene diisocyanate, 4-isopropyl-1,3-phenylene diisocyanate, 4-chloro-1,3-phenylene diisocyanate, 3,3'-dimethyl-4,4'-diisocyanatodiphenyl methane, 3,3'-bitolylene-4,4'-diisocyanate, 4,4'-diisocyanato diphenyl sulfone. Useful alkylene diisocyanates include hexamethylene diisocyanate, ethylene diisocyanate, dodecamethylene diisocyanate, and pentamethylene diisocyanate.

The polyamide-imides are employed as wire enamels while in solution in a solvent system such as those specified above. It is applied to an electrical conductor, e.g., copper, silver, aluminum or stainless steel wire in conventional fashion, e.g., by the "free dip" method or the "die application" procedure, both of which procedures are described in Meyer Patent No. 3,201,276. Wire speeds of 15–40 feet per minute can be used with wire tower temperatures of 400° 900°F, usually with a final temperature above 500°F. The build-up of the polyamide-imide enamel on the wire can be 0.0013 to 0.0049 inch, preferably 0.0026 to 0.0034 inch using No. 18 wire. The wire is passed through the enamel one or more times until the desired build-up is obtained. By build-up is meant the total increase in diameter over the bare wire diameter.

As noted above, the soluble polyamide-imides can be converted to tough, infusible and insoluble resins. Advantageously, this is accomplished in the process of forming films, coatings, fibers, impregnated and molded articles. For example, a solution of the product, that is the polyamide-imide, is applied to a wire, or other surface, and heated at a temperature of about 200° to about 420°C, usually about 300°–400°C (for wire coatings), for a time sufficient to evaporate solvents and form the insoluble polyamide-imide. At 400°C, about one minute is usually sufficient, while at 300°C, and 2 minutes are required.

In this manner, surfaces, sheets, etc., made out of metal like steel, copper, aluminum, nickel, etc., for example, or various alloys, can be coated. Similarly, laminated objects having a plurality of layers bonded together with the polyamide-imide polymer can be made. Each layer is made up of a polyamide-imide on the material to be laminated which has been connected to the polyamide-imide. The lamination is carried out by placing the object to be laminated in the polyamide-imide of this invention dissolved in an organic solvent and then curing each layer at elevated temperatures. As one layer of the polyamide-imide is cured, the objects can again be placed in the polymer solution and the process continued. Glass or asbestos fibers can be coated by depositing the polyamide-imide in solution on said materials and then heat curing it.

The polyamide-imides of this invention generally have inherent viscosities of at least 0.3 dl/g (in DMAC, at 25°C). The properties of the polyamide-imide, when cast as a film, show that it has a tensile strength at 25°C of between 13,500 and 15,000 psi and an elongation at 25°C from 10 to 25% in addition to having excellent electrical properties and thermal stability.

The following examples illustrate some embodiments of this invention. It will be understood that they are for illustrative purposes only and do not purport to be wholly definitive as to conditions or scope.

EXAMPLE I

Into an appropriate vessel equipped with a stirrer, nitrogen purge, thermometer, trap with condenser, is placed 420.2 parts trimellitic acid, 317.2 parts methylenebis(aniline), 260.0 parts N-methylpyrrolidone and 38.7 parts (40 ml) pseudocumene. The mixture is brought to 220°C over a 2.5 hr. period during which time some aqueous material is withdrawn from the trap. The solution is held at 220°–225°C for 5 hrs. A very gentle reflux will occur. Heat is removed and 1500 parts N-methylpyrrolidone are added over a 20 min. period. When the temperature has reached~130°C 800 parts xylene are then added. The solution is allowed to cool with stirring. At 25°C 100.0 parts Isonate 125 mf are added and the mixture brought to 155°C over a 2 hr. period. The Gardner-Holdt viscosity after 60 min. at 155°C was F. An additional 34.5 parts Isonate 125 mf were added over a 95 min. period giving a Y(+) viscosity. Inspection of the product at 25°C gave the following:

Brookfield — 24 Poise
Solids — 24.1%
Inherent (DMAC) - 0.42 dl/g (0.5 g per 100 ml DMAC)

A. A sample was wire coated on copper wire using 4 passes of undercoat Isonel 200 XWE490, which is polyester modified by tris hydroxyethylisocyanurate (manufactured by Schenectady Chemical Co.) and 2 passes of the solution prepared in Example I hereinabove.

1 DuPont R-900
2 Shepard Chem. Co.

D. Adhesive Application:
T-Peel - Samples of the product prepared in Example I were spread on Cold Rolled Steel (Bonderite 1000 treatment) and cured under vacuum at 80°C for 16 hours (for T-Peel adhesion) and likewise coated on 0.064 inch Hot Rolled Stell (chloroethene cleaned) and cured for Lap Shear tests.
T-Peel Adhesion - 15.2 psi
Lap Shear - 1380 psi The test specimens were prepared using a 15 sec. activation at 20 psi at 660°F on a Sentinel heat sealer.

E. Film:
A sample from Example I was spread on glass and cured 2 hrs. at 85°C (under vacuum), 30 min. at 300°F, 15 min. at 500°F, and 3 min. at 600°F.
Tensile Strength — 15,800 psi
Elongation — 11.5%

EXAMPLE II

Into an appropriate vessel equipped with a stirrer, nitrogen purge, thermometer, and trap with condenser is placed 166.1 parts isophthalic acid, 119.0 parts methylenebis(aniline), 190.0 parts N-methylpyrrolidone, and 17.6 parts pseudocumene. The contents of the flask were brought to 220°C over a 2.5 hour period. Some aqueous material was withdrawn from the trap during this period. After a 4 hour hold at 220°C, 820 parts of N-methylpyrrolidone were added over a 20

WIRE COATING DATA

| Sample | Speed (FPM) | Cure Temp | Bottom Temp | Build (MILS) | 20% (SPM) | 40% (SPM) | Burnout (SEC.) | Dielec. (KVPM) | Scrape (KG) |
|---|---|---|---|---|---|---|---|---|---|
| A | 40 | 850 | 500 | 2.9 | 1x | 2x | 580 | 4.5 | 1.52 |
|   |    |     |     |     |    |    | 603 | 10.5 | 1.70 |
|   |    |     |     |     |    |    | 566 | 9.5 | 1.48 |
| B | 50 | 850 | 500 | 2.9 | 1x | 1x | 583 | 2.82 | 1.57 |
|   |    |     |     |     |    |    | 565 | 9.5 | 1.65 |
|   |    |     |     |     |    |    | 615 | 8.5 | 1.45 |
|   |    |     |     |     |    |    | 600 | 8.0 | 1.70 |
| C | 60 | 850 | 500 | 2.9 | 1x | 1x | 593 | 3.00 | 1.60 |
|   |    |     |     |     |    |    | 588 | 6.5 | 1.35 |
|   |    |     |     |     |    |    | 604 | 6.5 | 1.55 |
|   |    |     |     |     |    |    | 619 | 5.5 | 1.40 |
|   |    |     |     |     |    |    | 604 | 2.13 | 1.43 |

B. A portion of the material prepared in Example I was wet spun into distilled water using a syringe. The strand produced was cured at 600°F for 5 min. The fiber was flexible and could be knotted.

C. Coating:
The following materials were placed in a ball mill:
74.7 parts Example I
8.0 parts TiO
2.5 parts No. 14 yellow
14.8 parts NMP The mixture was rolled overnight and then spread on a Bonderite 37 steel panel. After a 12 min. cure at 500°F the panel (coating) gave the following properties:

| | |
|---|---|
| Cured Film Thickness | - 1 mil |
| Pencil Hardness | - 5H |
| Sword Hardness | - 27 |
| Cross-Hatch Adhesion, % | - 100 |
| ⅛" Conical Mandrel Bend, % | - 100 |
| Direct Impact (in-lbs) | - >160 |
| Reverse Impact (in-lbs) | - >160 | min. period. When the temperature had fallen to 135°C, 100 parts Isonate 125 mf were added and heating continued for 1 hour. An additional 20 parts Isonate 125 mf were added over 1.5 hours yielding a solution having a Gardner viscosity of Z6(+) at 26.5% solids. The product was removed from solution by precipitation (in water) in a Waring Blendor. The polymer was filtered and dried. A sample of the polymer was compression molded at 550°F:

| TIME (Min.) | PRESSURE (Tons) |
|---|---|
| 45 | Contact |
| 2 | 2.5 |
| 2 | 5 |
| 1.0 | 10 |
| 4 | 25 |
| 1.0 | 50 |
| 5 | 25 |

The mold was cooled to~450°F and the specimen ejected. The tensile strength was 12,186 psi at an elongation at break of 5.3%.

EXAMPLE III

Into an appropriate vessel equipped with a stirrer, nitrogen purge, thermometer, and trap with condenser is placed 222.2 parts of tert-butylisophthalic acid, 104.6 parts hexamethylene diamine, 100 parts N-methylpyrrolidone, and 17.6 parts pseudocumene. The contents of the flask were brought to 220°C over a period of 2.5 hours and held at 220°–5°C for a length of 5 hours. Some aqueous material was drained from the trap during this period. Heat was removed and 880 parts N-methylpyrrolidone added over a 20 min. period. The system was allowed to cool to 25°C. Isonate 125 mf (30 parts) was added and the mixture brought to 135°C over 1 hour. An additional 18 parts 125 mf were added over a 2 hour period yielding a product having a Brookfield viscosity of 232 poises at 26.2% solids. The product was precipitated into water in a Waring Blendor, filtered and dried. A sample was molded at 340°F according to the schedule shown in Example II. The tensile strength was 14,248 psi at an elongation at break of 9.5%.

COATED WIRE TESTS

The wire enamel in the example was coated on a G.E. 15 foot two zone, vertical, forced air enameling oven. Six coating passes were used to apply the proper insulation thickness. The wire (copper) thickness was 18 AWG. The coated magnet wire was tested according to ASTM D-1676 for film thickness, film flexibility and adherence and unidirectional scrape resistance. Short term thermal stability or burnout was determined according to the overload test procedure given in NEMA MW 1000 (Part 3, Sec. 3-2.6).

The flexibility and adhesion were tested according to ASTM D-1676. To be amenable to automatic winding and normal abuse the wire should take a full snap. This means it should be capable of being drawn rapidly to break and have the stretched portions of the coating on the wire remain integral, i.e., it should have no cracks (brittleness) and it should not "tube" or separate from the substrate (poor adhesion). In addition to passing this snap adhesion test, it is desirable that the stretched portion of a wire which has been stretched either 20% of its original length (20% jerk) or to the breaking point (full snap) be capable of being wound about a mandrel as small as possible. The mandrels used are 1, 2, 3, etc. Hence, a rating terminology for magnet wire flexural properties is full snap —or 20% jerk + SPM (smallest passing mandrel). Normally the 20% jerk test is considered more realistic in regard to commercial usage with a value of IX being considered the top rating. A 20% jerk-SPM of 2 is considered very good, 3 is acceptable, 4 is a marginal pass-fail and 5 is failure.

We claim:

1. A process for preparing high molecular weight polyamide-imide polymers having film-forming properties which process comprises first condensing trimellitic acid and a primary diamine in a mole ratio of about 1 to 0.7 to about 1 to 0.95 at a temperature of about 210°C. to about 250°C. to give a low molecular weight polymer having an excess of trimellitic anhydride moieties and then further condensing this polymer with about 0.05 to about 0.75 moles of a diisocyanate for each mole of trimellitic acid moiety in an inert solvent at a temperature of about 25°C. to about 150°C.

2. The process of claim 1 wherein the molar ratio of the trimellitic acid to the diamine is about 1 to 0.7 to about 1 to 0.8 and the mole ratio of the diisocyanate to the trimellitic acid moiety is 0.2:1 to 0.3:1.

3. The process of claim 1 wherein the condensation of the trimellitic acid with the diamine is carried out at a temperature of about 220°C to about 230°C and the further condensation is carried out at about 130°C to about 140°C.

4. An electrical conductor having a continuous coating of the polyamide-imide prepared according to the process of claim 1.

5. A film of the polyamide-imide prepared according to the process of claim 1.

6. A process according to claim 1 wherein the aromatic diamine is methylene dianaline.

7. A process according to claim 1 wherein the aromatic diisocyanate is methylene-p-phenyldiisocyanate.

8. A fiber prepared from the polyamide-imide prepared according to the process of claim 1.

9. An adhesive of the polyamide-imide prepared according to the process of claim 1.

10. A laminate having a plurality of layers bonded together with the polyamide-imide prepared according to the process of claim 1.

11. A molded article prepared from the polyamide-imide of claim 1.

12. In combination with an article coated with a protective material, wherein the improvement comprises the coating material which is a high molecular weight polyamide-imide polymer prepared by a process comprising first condensing trimellitic acid and a primary diamine in a mole ratio of about 1 to 0.7 to about 1 to 0.95 at a temperature of about 210°C. to about 250°C. to give a low molecular weight polymer, further condensing this polymer with about 0.05 to about 0.75 moles of a diisocyanate for each mole of trimellitic acid in an inert solvent at a temperatue of about 25°C. to about 150°C.

* * * * *

UNITED STATES PATENT OFFICE
CERTIFICATE OF CORRECTION

Patent No. 3,959,233            Dated May 25, 1976

Inventor(s) Robert B. Hanson and James R. Stephens

It is certified that error appears in the above-identified patent and that said Letters Patent are hereby corrected as shown below:

Column 5, line 54, "TiO" should be -- $TiO_2$ --.

" 8, " 10, "anhydride" should be -- acid --.

Signed and Sealed this

*Twenty-fifth* Day of *April 1978*

[SEAL]

Attest:

RUTH C. MASON        LUTRELLE F. PARKER
*Attesting Officer*        *Acting Commissioner of Patents and Trademarks*